United States Patent
Siliani et al.

[11] Patent Number: 6,152,277
[45] Date of Patent: Nov. 28, 2000

[54] LOAD LIMITING DEVICE TO TRANSMIT AN AXIAL MOTION TO OPERATING MECHANISMS

[75] Inventors: Claudio Siliani, Florence; Maurizio Biagiotti, Pisa, both of Italy

[73] Assignee: Siliani Harmon S.p.A., Italy

[21] Appl. No.: 09/311,929

[22] Filed: May 14, 1999

[30] Foreign Application Priority Data

May 15, 1998 [IT] Italy .................................. FI98A0108

[51] Int. Cl.$^7$ ............................ F16D 11/04; F16D 13/22; F16D 13/54
[52] U.S. Cl. ......................... 192/150; 192/56.1; 192/56.2
[58] Field of Search ................... 192/150, 55.1, 192/56.1, 56.2, 54.1

[56] References Cited

U.S. PATENT DOCUMENTS

| | | | |
|---|---|---|---|
| 2,701,478 | 2/1955 | Riess | 74/424.8 |
| 3,801,215 | 4/1974 | Osborne | 415/131 |
| 4,579,201 | 4/1986 | Tiedeman | 192/8 C |
| 4,637,502 | 1/1987 | Mayr et al. | 192/56 R |

FOREIGN PATENT DOCUMENTS 3322566  1/1985  Germany.

OTHER PUBLICATIONS

European Search Report, The Haque, Mar. 8, 1999, Examiner Flores E.

Primary Examiner—Charles A Marmor
Assistant Examiner—Tisha D. Waddell
Attorney, Agent, or Firm—Hedman, Gibson & Costigan, P.C.

[57] ABSTRACT

A load limiting device to transmit an axial motion to operating mechanisms, comprising: an engaging element (6, 68) which can be connected to a mechanism (4); self-bearing means (2,5) transmitting in axial direction the motion of a driving group (1); a disengagement group (7) which is integral with the element transmitting the axial motion and comprises one or more elastic disengagement means (72) which are connected with the engaging element (68); means (73,74) to adjust the threshold value of the axial load causing said elastic disengagement.

24 Claims, 3 Drawing Sheets

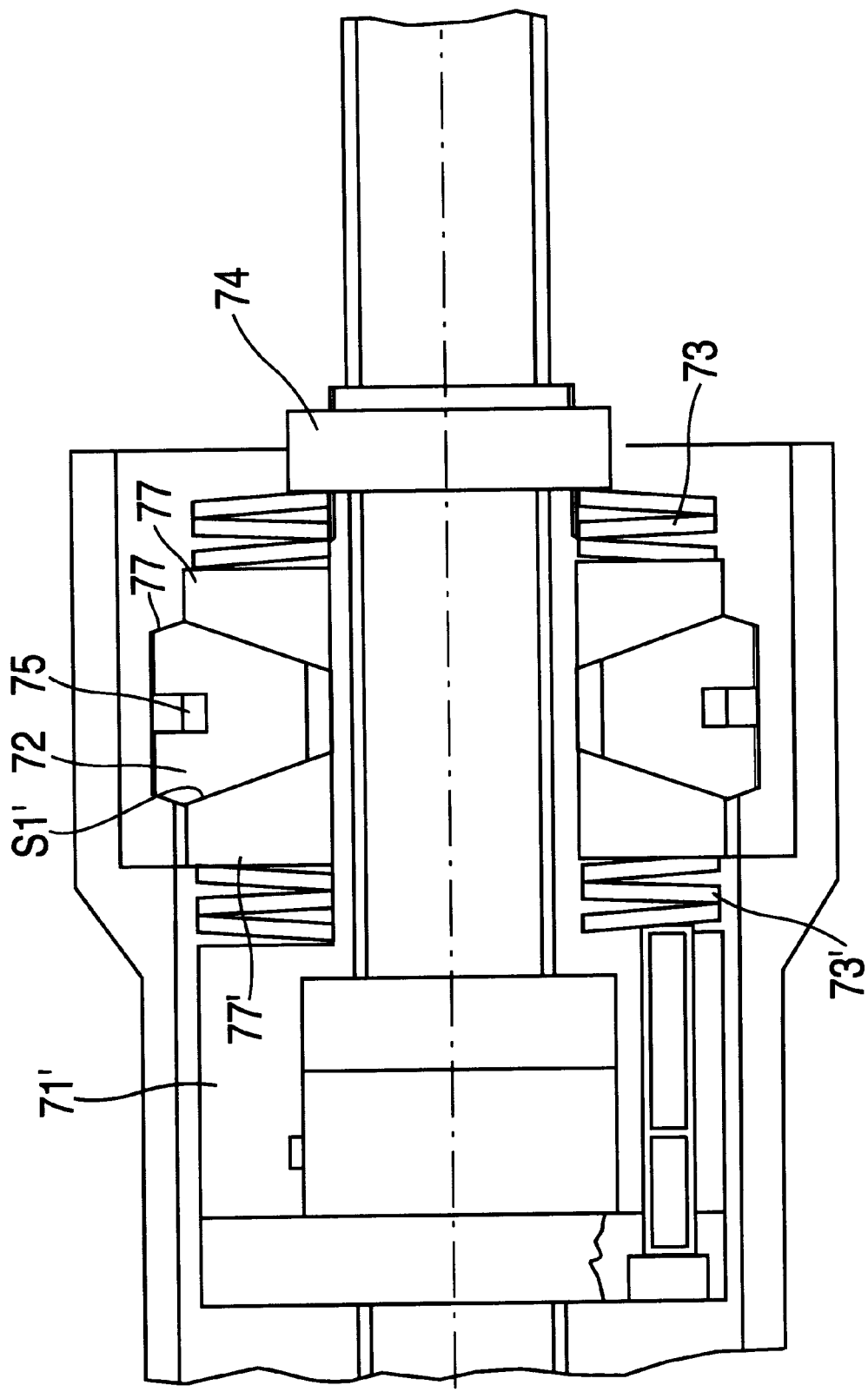

LOAD LIMITING DEVICE TO TRANSMIT AN AXIAL MOTION TO OPERATING MECHANISMS

FIELD OF THE INVENTION

The present invention relates to a load limiting device intended to limit the axial force which can be exerted to move operating elements.

PRIOR ART

At present, several devices to axially displace operating elements (for example shafts) are already known.

These devices comprise axially concentric transmission elements which are connected at a predetermined point of a shaft through a load limiting device, possibly of the adjustable type.

By the limiting device, a threshold value of the applied load can be fixed. Over this value the shaft is disengaged from the limiting device in order to avoid any over loads which could damage the structure.

It is also known that once the limiting device has performed its function it is important that the connection between the shaft and the transmission element can be automatically re-established in order to allow the following operation to start without that a manual maintenance is required.

To solve this kind of problem it is possible to install the limiting device on the shaft upstream of the direction of the possible disengagement of the same shaft. In this way the limiting device is supported by the shaft and can coaxially slide without coming out from the shaft after the relative motion following their disengagement. Unfortunately, in case of bi-directional operating shafts, the latter solution involves the need to provide a shaft having a length which has to be at least twice the operational stroke of the shaft. This limitation is often unacceptable due to design specifications.

AIM OF THE INVENTION

A first aim of the invention is to overcome the limits and the drawbacks of the already known limiting devices.

A second aim of the invention is to provide an high-reliable load limiting device able to displace operating mechanisms suitable for a bi-directional functioning.

SUMMARY OF THE INVENTION

These aims have been reached according to the invention by a load limiting device able to axially displace operating mechanisms, which comprises: an engagement member which can be connected to an operating element; a self-bearing member transmitting the axial motion and preferably consisting of a nut engaging an endless screw; a load limiting group integral to the above said member transmitting the axial motion and comprising one or more elastic means connected to the engagement member (for example one or more radial inserts); means to adjust the threshold value of the elastic engagement, these means being preferably constituted by one or more axially arranged bucket springs; and means to contain said elastic means, consisting for example of a retaining ring.

According to the invention the engagement member can be disengaged from the load limiting group when an axial over load occurs on the driving elements in one of the axial directions. However, the endless screw (and then the load limiting group) does not miss a substantial reciprocal alignment with the engaging member which is then able to reach the engagement position again on the subsequent axial stroke of the nut.

Furthermore, the device is provided with position reference means and with suitable external contacts of the electromechanical and/or electronic type.

DETAILED DESCRIPTION OF THE INVENTION

Further advantages will be evident for the man skilled in the art from the following description and from the annexed drawings, given as a non limitative example, in which:

FIG. 3 shows a second preferred embodiment of the invention;

Figure 1:
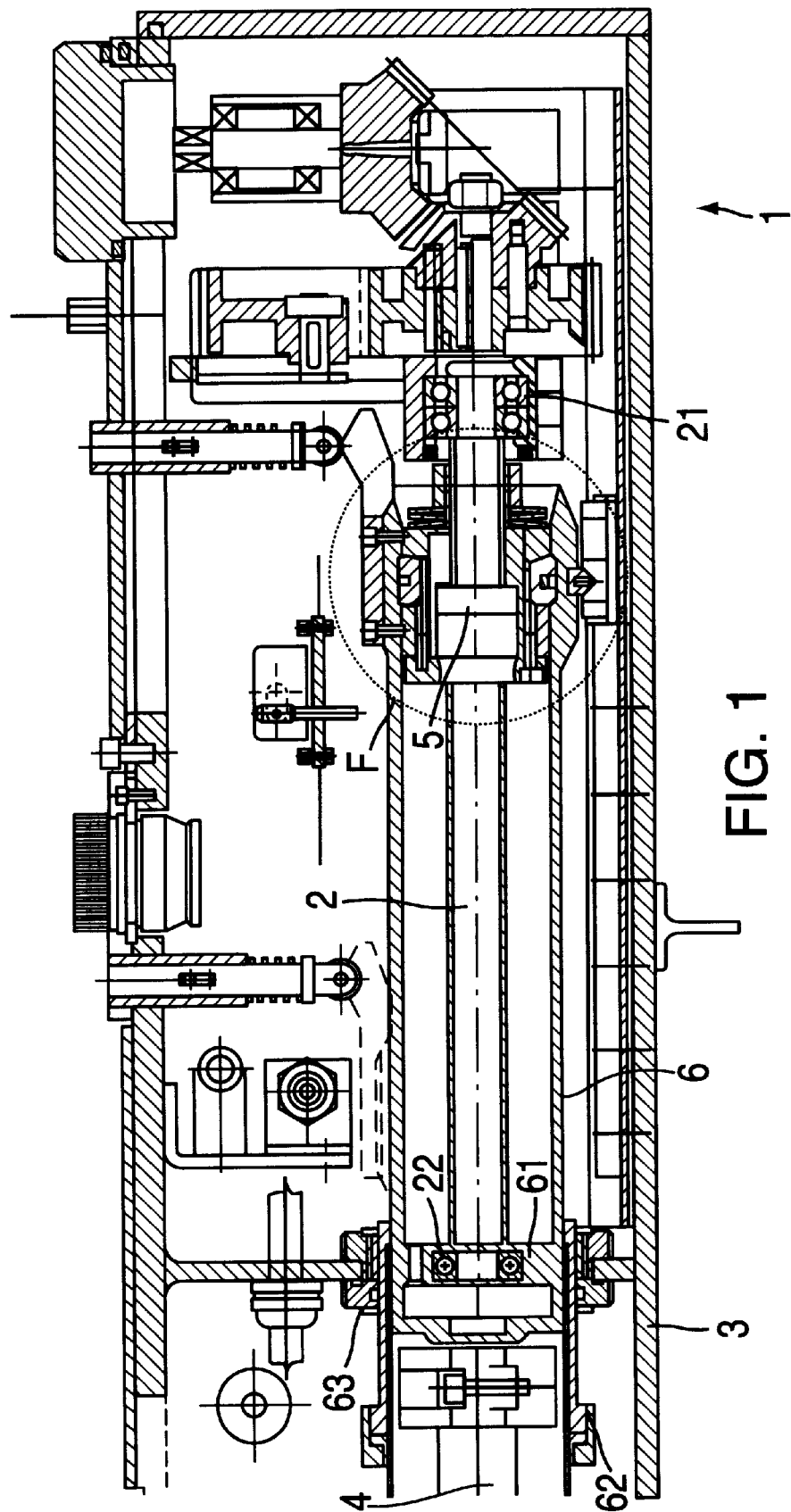
FIG. 1 shows a schematic view of a device according to the invention.

With reference to FIG. 1 a device according to the invention consists of a driving group 1 which rotationally drives a first extremity of an endless screw 2, preferably a sphere endless screw, thus determining the axial displacement of a nut 5 mounted on the endless screw 2.

Endless screw 2 is supported by a couple of bearings 21, 22 the first one being engaged with the driving group 1 and the second one being positioned at the second extremity of the screw.

Screw 2 is arranged internally and coaxially to an hollow cylindrical shaft 6 which can axially slide in respect of the screw 2 and is engaged with the nut 5 by a load limiting group 7. Group 7 is mounted on the screw by a sliding friction support element 61 into which the bearing 22 is positioned.

The axial motion of shaft 6 is guided by the bushings 63 of a support 62 fixed to an external case inside which the driving group 1, screw 2 and shaft 6 are also contained.

Figure 2:
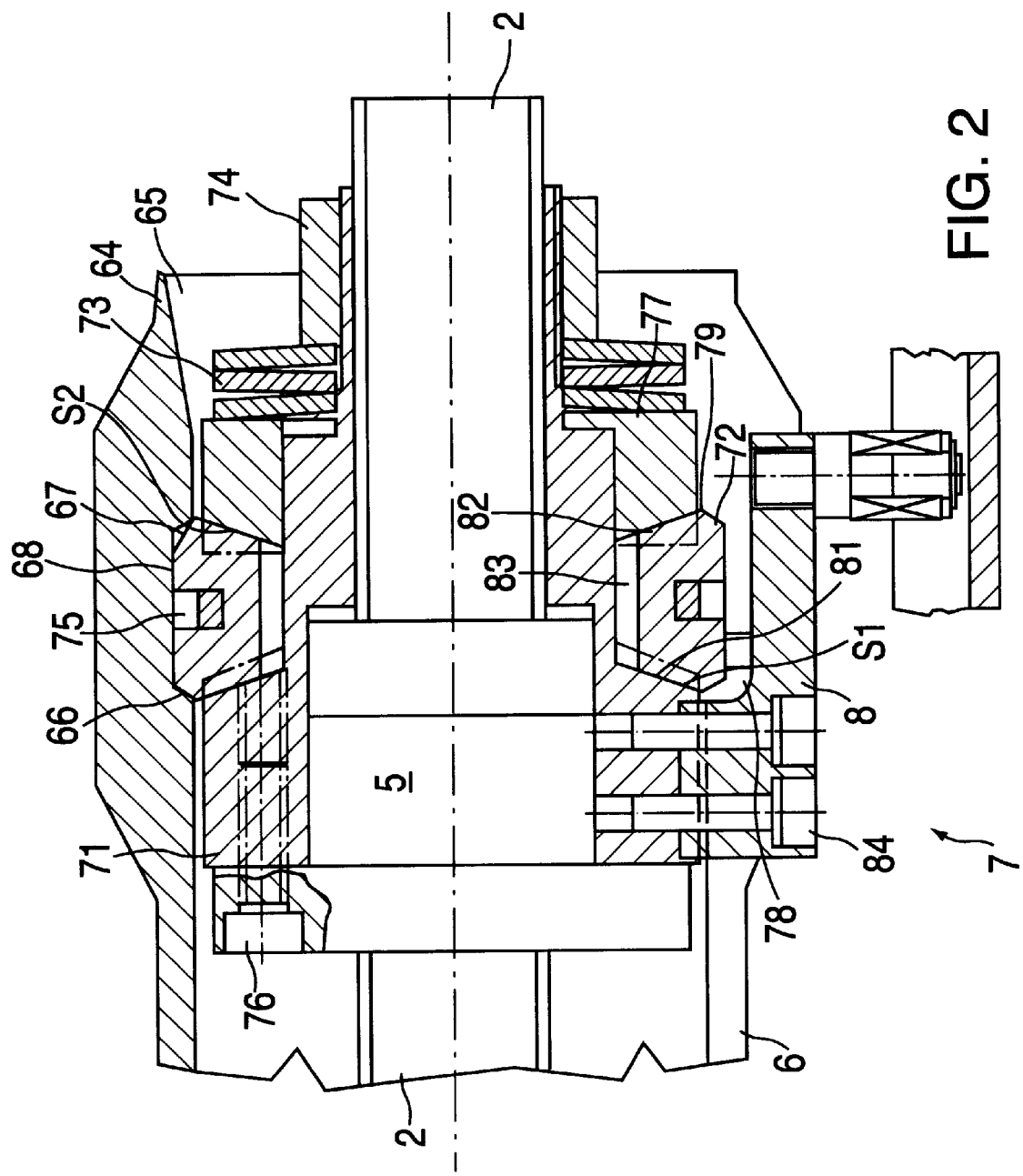
FIG. 2 shows a detail of the load limiting group provided with a reference arm.

With reference now to FIG. 2, the load limiting group 7 connecting screw 2 to shaft 6 is described.

A sleeve 71 presenting a sloping surface S1 is mounted on nut 5 by screw means 76. Two frustum-pyramidal inserts 72 are in turn mounted on sleeve 71. The inserts have upper lateral sides in the shape of sloping surfaces 78, 79. Inserts 72 are closed, in the lateral direction, by the sloping surface S2 of a ring 77 and, in the radial direction, by a retaining ring 75. On ring 77 at least a bucket spring 73 exerts a force which is adjustable by a threaded bush 74. Bush 74 is engaged with a corresponding external thread of the sleeve 71 so that it adjusts the force exerted by spring 73 and at the same time is able to axially contain the various components of group 7.

Inserts 72 are surrounded on the upper side by a circumferential groove 68 which is present in the internal surface of shaft 6 and which acts as engaging member of the inserts with the shaft. Groove 68 present front and rear sloping edges 66, 67 (corresponding in FIG. 2 respectively to the left and right sides). Inserts 72 are slidingly inserted into slots 81, 82 which are respectively provided on surfaces S1, S2 and which act as inclined planes for the radial sliding motion of inserts 72. Between the lower surface of inserts 72 and sleeve 71 a free space 83 having at least the same height of groove 68 is provided.

In FIG. 2 a reference arm 8 fixed to sleeve 71 by screw means 84 is also shown. During the stroke of the shaft, arm 8 touches front and rear end-stroke reference contacts. As it will be better hereinafter described, when a disengagement between group 7 and shaft 6 occurs, the reference arm 8 slides along an axial slot of the shaft 6 which extends from the rear extremity 65 of the shaft to the front end-stroke point.

The motion of arm 8 is guided by a guide 85 which is parallel to the screw and avoids any possible rotational motion of the nut 5 in respect of the screw.

Advantageously, at the engaging point with group 7 shaft 6 presents a thickened portion which ensures the needed stiffness in spite of the presence of the groove. Extremity 65 of the shaft 6 presents a conical shape in order to facilitate the group 7 to automatically enter again into the shaft 6 after that a disengagement has occurred.

In functioning, driving group 1 causes a rotational motion of the screw 2 and determines the axial displacement of nut 5 and of the shaft 6 which is thereto connected through the limiting group 7. Starting from the end stroke point of FIG. 1 the forward motion of nut 5 determines the displacement of the shaft 6 until it reaches the second end-stroke point where, at the proper time, a suitable contact will give to the driving group 1 the instruction of inverting the direction of the following displacement.

In the regular functioning the shaft will be driven from the nut 5 from the second, back to the first end-stroke point. However, it is also possible that an over load is applied on shaft 6. In this case, the force exerted on the shaft is transmitted by the sloping surfaces 66 to the inserts 72 and then on the ring 77 and this can overcome the opposite force which is applied on the ring by the spring 73 which is then compressed. As a result, the inserts slide in the radial direction and the shaft is disengaged from group 7. In this situation, when the screw 2 moves the nut 5 back, the group 7 can slide inside the shaft and it reaches again its engagement position.

A second disengagement possibility occurs when the over load on the shaft forces the same shaft to go forward while the limiting group is at the initial point of the stroke. In this case the pressure of the sloping surfaces 67 on the rear sloping surfaces 78 of the inserts causes, as previously seen, the compression of spring 73 and the radial displacement of the inserts, so that a relative motion occurs and group 7 gets out from shaft 6.

It is evident that the device functions in a similar way when the over load is due to an unwanted stop of the shaft 6 during its normal displacement so that the predetermined load threshold value is exceeded.

According to the invention, the retaining ring 75 avoids that inserts can move outwardly for a distance greater than the engagement height of the same inserts with the groove 68. Furthermore, ring 75 ensures that the inserts have a free margin of radial displacement which allows the spring pressure to be adjusted.

Advantageously, the inclination of the sloping surfaces 78 can also be different from the inclination of the surfaces 79, to take account of the different conditions which are present in the two described cases and of the possible dynamic dissymmetry which can be caused by the frictional effects.

In the second case screw 2 is supported by bearings 21, 22 while shaft 6 is kept in aligned position by group 62. To re-establish the connection between the shaft and the group 7 it is then sufficient that the driving group 1 moves the nut 5 forward, so that it can enter the conical opening 65 and the inserts engage groove 68 again.

In the above described embodiment an engagement member consisting of a cylindrical shaft has been considered, but engagement members having different shape can be used within the scope of the invention. Such engagement members can also be free from any function of guiding the limiting group.

In FIG. 3 a preferred embodiment of the invention is shown, which permits to overcome the above said drawbacks due to dynamic dissymmetry.

In this embodiment, the device comprises a second spring 73' (or group of springs) which is compressed between a fixed wall of a sleeve 71' and a second ring 77'. Ring 77' is substantially identical to ring 77 and is simmetrically mounted on the sleeve 71' in respect of the inserts 72 which are comprised between the sloping surfaces S1 of ring 77' and S2 of ring 77.

Advantageously, with this solution any risk of possible differences in the dynamic behaviour of the device in the two axial directions is avoided and it is no longer necessary to provide different inclinations of the surfaces 78, 79 of the inserts.

More particularly, the device according to the invention has a substantially self-bearing structure which does not depend on the engagement conditions with the element which has to be displaced. In the described solution, such self bearing structure is ensured by the presence of the endless screw (which ensures the aligned position of group 7 in any conditions) and of the retaining ring 75 (which guaranties the functioning of the inserts of the limiting group).

According to different embodiments, a radial arrangement of the elastic means can be also considered. However, in the described solution the axial bucket springs and the retaining ring (which is comprised inside the radial dimension of the inserts) allow the device to occupy the minimum space in the radial direction and to have a limited size in the axial direction.

The present invention has been described with reference to preferred embodiments, but equivalent changes can also be made by the man skilled in the art without departing form the scope on the invention

What is claimed is:

1. Load limiting device to transmit an axial motion to operating mechanisms, wherein it comprises: first engagement means connected to said operating mechanisms; self-bearing transmission means transmitting in both the axial directions the motion generated by a driving group; a load limiting group integral to said axial motion of the transmitting means and comprising second engagement means which are elastically connected in a substantially symmetrical manner with said first engagement means; elastic means able to fix and adjust a threshold value of the load required to cause a disengagement between said first and second engagement means.

2. Device according to claim 1, wherein said self-bearing axial transmission means are constituted by a nut engaged with an endless screw mounted on end bearings.

3. Device according to claim 2, wherein said second engagement means consist of one or more frusto-pyramidal radial inserts which are comprised between two lateral sloping surfaces the first one being part of a sleeve integral to said nut and the second one being part of a ring which can axially slide being forced against said inserts by said elastic means, and that said first engaging means consist of a circumferential groove of an hollow shaft coaxial to said screw, the inserts being able to engage the groove by front and rear sloping sides.

4. Device according to claim 2, wherein said second engagement means consist of one or more frusto-pyramidal radial inserts which are comprised between two symmetrical sloping surfaces the first one being part of a first ring mounted on a sleeve integral to said nut and the second one being part of a second ring mounted on said sleeve, wherein the rings can axially slide so that they are forced against said inserts by said elastic means, and that said first engaging means consist of a circumferential groove of an hollow shaft coaxial to said screw, the inserts being able to engage the groove by front and rear sloping sides.

5. Device according to claim 3, wherein said inserts can slide along slots of the sloping surfaces.

6. Device according to claim 3, wherein said end bearings are mounted on a support sliding inside said shaft.

7. Device according to claim 3, wherein said hollow shaft is slidingly mounted on a support of a fixed structure.

8. Device according to claim 3, wherein said groove presents sloping edges which oppose to the sloping sides of said inserts.

9. Device according to claim 3, wherein the slope of the front sides differs from the slope of the rear sides in order to take account of the different conditions and of any dynamic dissymmetry which can be caused by the frictional effects acting in the two axial directions.

10. Device according to claim 3, wherein the rear extremity of said hollow shaft presents a conical opening in order to facilitate the limiting group to enter into the shaft again after that a disengagement has occurred.

11. Device according to claim 3, wherein said elastic means consists of at least one bucket spring which is arranged co-axially to said screw and is forced against said ring by a threaded bush.

12. Device according to claim 4, wherein said elastic means consist of first and second bucket springs which are arranged co-axially to said screw the first spring being pressed against said first ring by a threaded bush mounted on said sleeve and the second spring being compressed between a fixed wall of the sleeve and the second ring.

13. Device according to claim 3, wherein it comprises retaining means of said elastic disengagement means consisting of a retaining ring which is inserted inside an encircling seat of said inserts.

14. Device according to claim 6, wherein it comprises a reference arm providing front and rear end stroke contact points.

15. Device according to claims 14, wherein said arm can slide along an axial slot of the hollow shaft and it is guided by a guide parallel to the endless screw and which avoid any possible rotational motion of said nut in respect of the screw.

16. Device according to claim 3, wherein the hollow shaft presents a stiffening portion at the engagement point with the load limiting group.

17. Device according to claim 4, wherein said inserts can slide along slots of the sloping surfaces.

18. Device according to claim 4, wherein said end bearing is mounted on a support sliding inside said hollow shaft.

19. Device according to claim 4, wherein said hollow shaft is slidingly mounted on a support of a fixed structure.

20. Device according to claim 4, wherein said groove presents sloping edges which oppose to the sloping front and rear sides of said inserts.

21. Device according to claim 4, wherein the rear extremity of said hollow shaft presents a conical opening in order to facilitate the limiting group to enter into the shaft again after that a disengagement has occurred.

22. Device according to claim 4, wherein it comprises retaining means of said elastic disengagement means consisting of a ring which is inserted inside an encircling seat of said inserts.

23. Device according to claim 4, wherein shaft presents a stiffening portion at the engagement point with the load limiting group.

24. Load limiting device to transmit an axial motion to operating mechanisms, characterized by the fact that it comprises: first engagement means connected to said operating mechanisms; self-bearing transmission means transmitting in both the axial directions the motion generated by a driving group; a load limiting group integral to said axial motion of the transmitting means and comprising second engagement means which are elastically connected in a substantially symmetrical manner with said first engagement means; elastic means able to fix and adjust a threshold value of the load required to cause a disengagement between said first and second engagement means, wherein after that said disengagement has occurred, said load limiting group is able to automatically reach again an engagement position of said second engagement means with said first engagement means during a subsequent motion of the load limiting group in the reverse axial direction.

* * * * *